Figure 1:
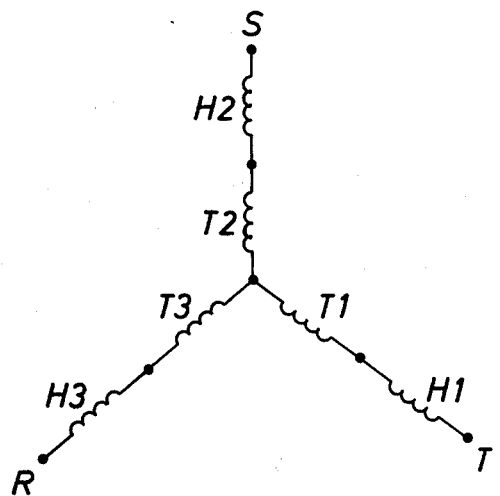

United States Patent [19]

Jensen

[11] 4,035,701

[45] July 12, 1977

[54] METHOD OF STEPWISE SPEED CONTROL AND THREE-PHASE SQUIRREL-CAGE MOTOR

[75] Inventor: Axel Jensen, Bjerringbro, Denmark

[73] Assignee: Grundfor A/S, Bjerringbro, Denmark

[21] Appl. No.: 562,456

[22] Filed: Mar. 27, 1975

[51] Int. Cl.² .......................................... H02P 1/32
[52] U.S. Cl. ................................................ 318/226
[58] Field of Search .............. 18/225 R, 226, 224 R

[56] References Cited

U.S. PATENT DOCUMENTS

| 1,502,909 | 7/1924 | Deflassieux | 318/226 |
| 1,949,808 | 3/1934 | Pedrazzo | 318/226 X |
| 2,422,906 | 6/1947 | Johnson | 318/226 X |
| 2,543,131 | 2/1951 | Seifried | 318/225 R |
| 2,763,825 | 9/1956 | Gibson | 318/226 |

FOREIGN PATENT DOCUMENTS 664,285  11/1928  France ................. 318/226

Primary Examiner—Gene Z. Rubinson

[57] ABSTRACT

A method of stepwise speed control, and three-phase squirrel-cage motor, that comprises main windings connected either in a delta or in a star circuit, the main windings being connected to at least one set of additional windings that are also connected either in delta or in star. The method permits at least five different speeds of rotation without the use of a transformer.

1 Claim, 7 Drawing Figures

METHOD OF STEPWISE SPEED CONTROL AND THREE-PHASE SQUIRREL-CAGE MOTOR

The present invention relates to a method of stepwise speed control in a three-phase squirrel-cage motor (asynchronous motor) with a set of three-phase stator windings comprising main windings being connected either in a star or in a delta circuit. The invention also relates to a motor of the described type.

In connection with the starting of squirrel-cage motors it is known in the art to switch the stator windings from star connection to delta connection in order to limit the starting current. The switching-over may further be used to control the speed after the starting. Thereby, however, it is only possible to obtain two different speeds of rotation at a particular load unless for example a transformer with a variable tap is inserted (a variotransformer).

One of the objects of the invention is to provide a method of the type stated above being simplified by the fact that it is possible to dispense with the transformer.

The method according to the invention is characterized in that the main windings connected either in star or in delta are connected to at least one set of additional windings being also connected either in star or in delta. This permits at least five different speeds if rotation without any transformer being used.

A method according to the invention employing only one set of additional windings may be characterized in that the speed of rotation of the motor is gradually increased by first connecting in star the main windings and connecting in star the additional windings, connecting in delta the additional windings, keeping free one terminal of the additional windings, connecting in delta the main windings and the additional windings and connecting in delta the main windings, keeping free one of the terminals of the additional windings.

Thereby are obtained at the same voltage five stepwise increasing speeds of rotation. The first increase in the speed of rotation is due to the additional windings using more current when connected in delta than when connected in star. The second increase results from the load current being increased by the additional windings being removed. The third increase is due to the delta connection being more loading than the star connection in spite of the fact that the additional windings are inserted in the delta connection. The fourth and last increase is the consequence of the additional windings no longer constituting reactive elements in the delta connection, and the load current is therefore further increased.

Further according to the invention the star or delta connections of the main windings and the additional windings as well as the connections therebetween are provided by means of demountably electrically conducting rails. Thereby the connetions between the main windings and the additional winds are simplified.

The invention also relates to a three-phase squirrel-cage motor (asynchronous motor) comprising a set of main windings connected to phase connecting terminals, the main windings being connected either in star or in delta. The squirrel-cage motor according to the invention is characterized in that the main windings connected in star or in delta are connected to at least one set of additional windings being also connected either in star or in delta. Hereby a particularly simple squirrel-cage motor is provided which permits speed control without the use of a transformer.

A squirrel-cage motor according to the invention in which the main windings are connected in star may be characterized in that those terminals of the main windings which are not connected to the phase connecting terminals are connected to the terminals of the star or delta connection of the additional windings. Thereby two different dependencies between torque and speed of rotation are made possible.

Finally, a squirrel-cage motor according to the invention having the main windings connected in delta may be characterized in that each of the additional windings is connected in series to the respective main winding in such a way as to connect in delta the series connections of a main winding and a corresponding additional winding. Thereby is obtained a third dependency between torque and speed of rotation without the use of a transformer.

Figure 2:
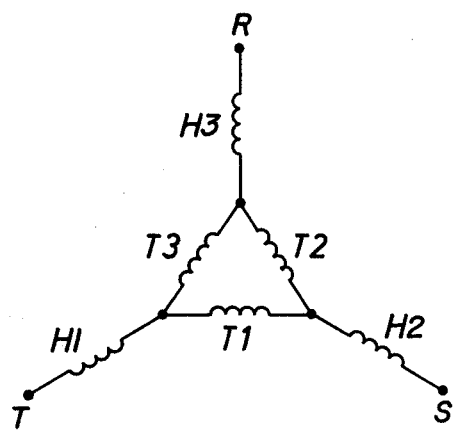
Figure 3:
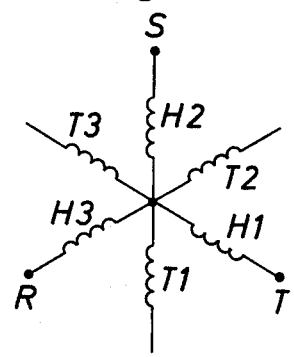
Figure 5:
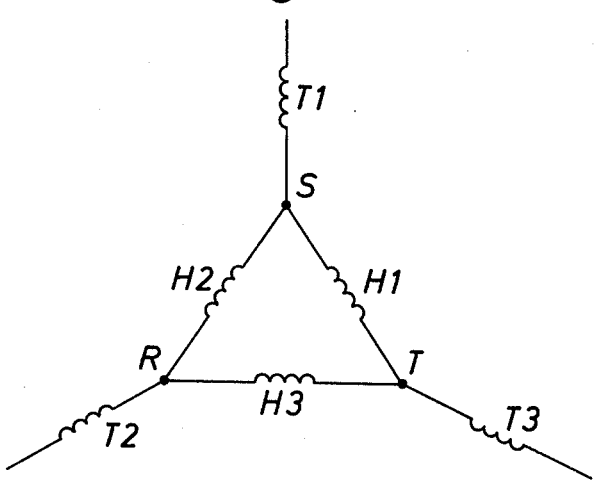
Figure 6:
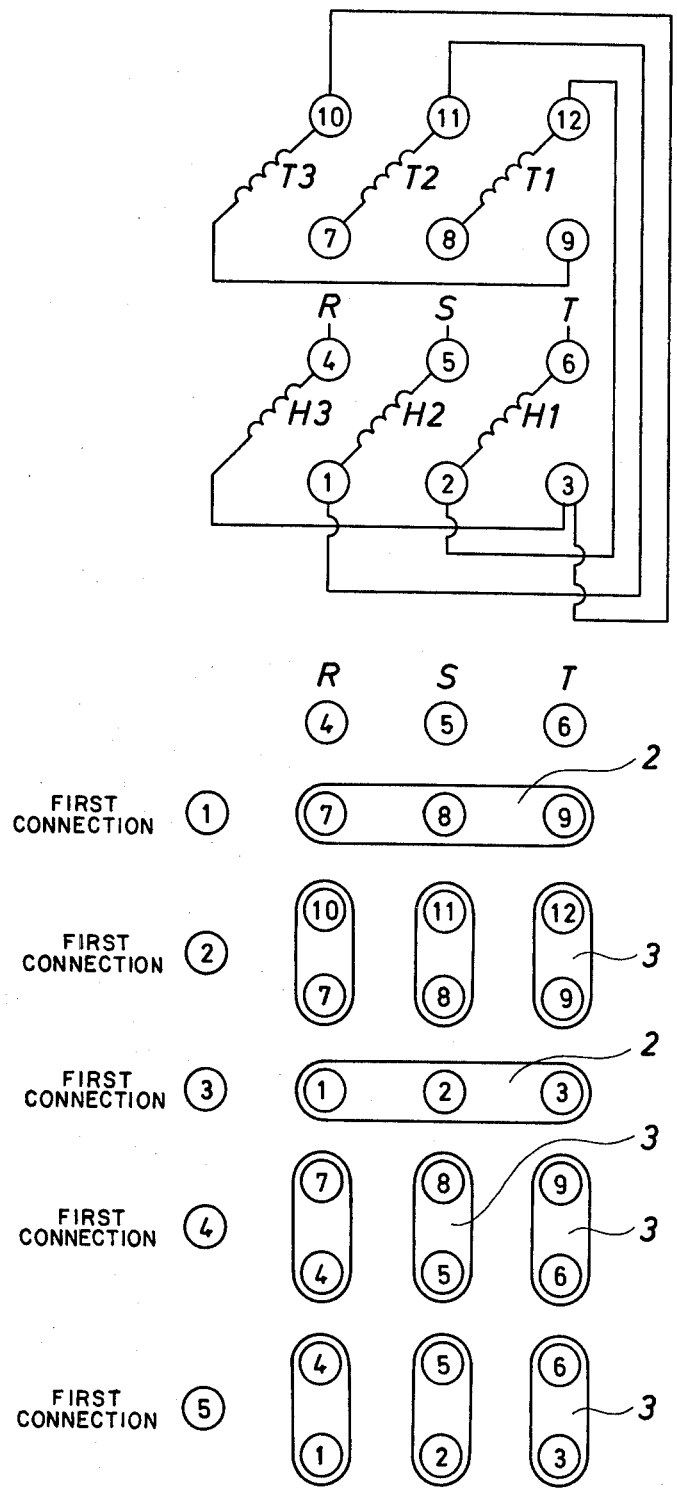
Figure 7:
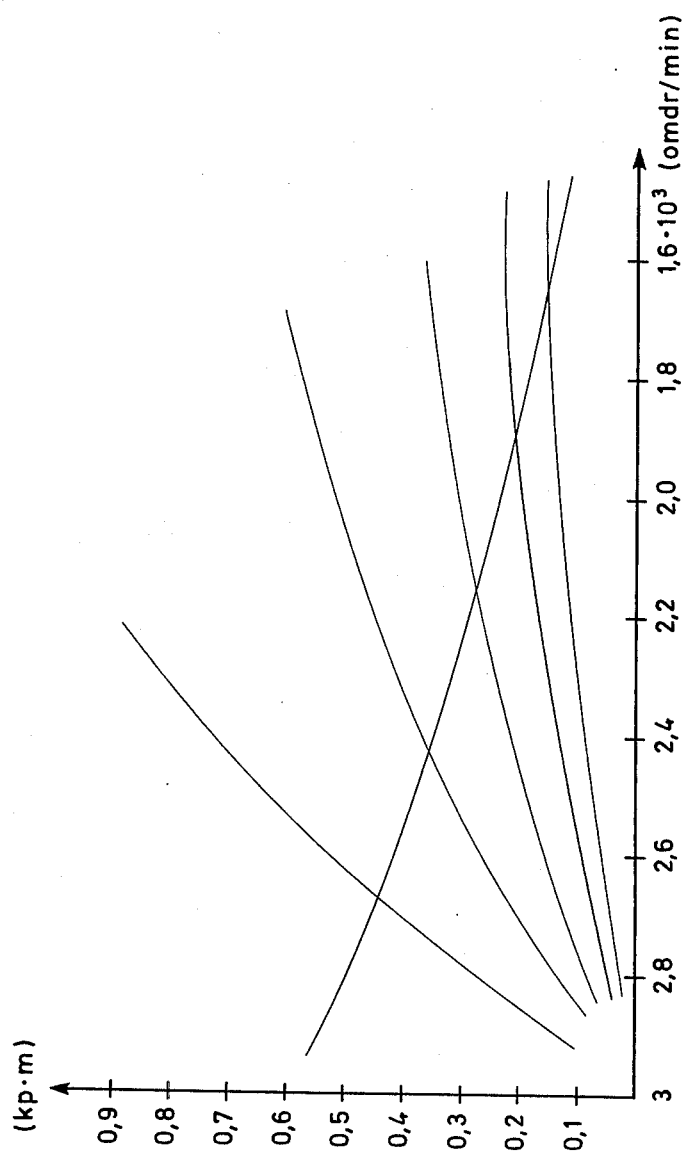

The invention will be described in greater detail below with reference to the drawings, in which FIG. 1 is a diagram of a first connection of main windings and additional windings in the stator coils in a squirrel-cage motor, FIG. 2 is a diagram of a second connection of the main and the additional windings, FIG. 3 is a diagram of a third connection of the main and additional windings, 4 is a diagram of a fourth connection of the main and additional windings, FIG. 5 is a diagram of a fifth connection of the main and the additional windings, FIG. 6 is a connection terminal system with corresponding electrically conducting rails mounted in five different ways, and FIG. 7 is the torque of the motor as a function of the speed of rotation, the rails being mounted in the above-mentioned five different ways.

The stator windings shown in FIGS. 1-5 belonging to a three-phase squirrel-cage motor comprise a set of main windings H1, H2, and H3 of equal value, being connected either in star or in delta, as well as one or more sets of additional windings T1, T2, and T3 being also connected either in star or in delta. Also in the individual set of additional windings the windings are of equal value.

Each individual additional winding T1, T2 or T3 is mounted so that its magnetic field is in phase with the magnetic field formed by the corresponding main winding H1, H2, or H3 respectively by applying the voltages in phase.

In a first connection — see FIG. 1 — of the main windings H1, H2, H3 and the additional windings are connected in star and one of the terminals of each of the main windings is connected to an additional winding. The other terminal of each of the main windings is connected to a phase connecting terminal R, S, or T. In this connection between the main and the additional windings H1, H2, H3 and T1, T2, T3 the windings use a rather small amount of current. The torque of the rotor being primarily determined by the current is consequently rather small.

In a second connection of main and additional windings H1, H2, H3 and T1, T2, T3 — see FIG. 2 — the additional windings T1, T2, T3 are connected in delta, one of the terminals of each of the main windings H1, H2, H3 being connected to one of the terminals of the delta. The other terminal of each of the main windins H1, H2, H3 is connected to one of the phase connecting terminals R, S or T. In this connection of the main and additional windings H1, H2, H3 and T1, T2, T3 the windings use a little larger amount of current, the delta connection of the additional windings being, as is well known, less reactive than the above-mentioned star connection of the same additional windings. Also the torque of the rotor will at the same speed of rotation be a little larger even though the magnetic field produced by a main winding H1, H2, H3 will not be entirely in phase with the field produced by a corresponding additional winding T1, T2, or T3 respectively.

By entirely omitting the additional windings T1, T2 and T3 which corresponds to giving said additional windings T1, T2, and T3 the reactance value 0, the current with which the main windings H1, H2, H3 load the three phases R, S, and T is increased. With this connection the torque is greater than with the connections of FIGS. 1 and 2 having the same speed of rotation.

Figure 4:
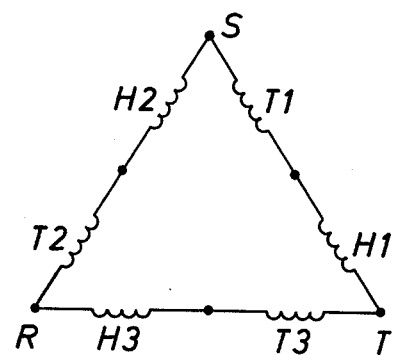

In a fourth connection of the main windings H1, H2, and H3 and the additional windings T1, T2 and T3 — see FIG. 4 — each of the additional windings T1, T2, or T3 is connected in series to the respective main winding H1, H2 or H3 respectively to constitute a stator winding. The stator windings are then connected in delta. This connection of the main windings H1, H2, and H3 and the additional windings T1, T2, and T3 will, if only each of the additional winding is less than the double of each of the main windings, load more than the stator winding shown in FIG. 3 at the same speed of rotation. The magnetic fields produced by one main winding and a corresponding additional winding further being in phase, also the torque will be increased.

In a fifth embodiment of the stator winding the main windings H1, H2, H3 are connected in delta. This delta connection may be formed by the reactance values of the additional windings being reduced to 0. Thereby the load current and the torque are increased.

means of the above connections of the main and the additional windings of the stator winding a possibility has thus been provided of changing over between five different torques at the same speed of rotation of the squirrel-cage motor. This change-over may preferably be effected by means of the electrically conductive rails 2, 3 shown in FIG. 6.

Thus, it is possible to control the torque of a squirrel-cage motor without using a voltage adjusting transformer with a variable tap or like.

The squirrel-cage motor according to the invention may for example be used for controlling the speed of pumps or ventilators, in which it is often necessary to have more than two speeds of rotation. A stable speed of rotation will be obtained if the torque of the motor increases when the speed of rotation decreases, corresponding with an increasing slip. This may be obtained by providing the rotor or its winding with a significant resistance. If the squirrel-cage motor is a slip-ring motor, the resistance may be the starting resistance.

FIG. 7 shows the torque of the motor as a function of the speed of rotation corresponding to a frequency of 50 Hz. At a torque of 0 kp · m the speed of rotation is 50 rotations/seconds · 60 seconds/minutes = 3000 rotations/minutes corresponding to the slip being 0%. When the torque increases the speed of rotation of the motor decreases approximately along a straight line as is usual in squirrel-cage motors or asynchronous motors with electric resistance in the current paths of the rotor.

In the figure further a mechanical load is marked, the value of said mechanical load increasing with the square of the speed of rotation. A pump or a ventilator has approximately such a load characteristic. With such a load the motor will after each change-over from one of the above-mentioned connections of main and additional windings seek to obtain equilibrium in the respective intersection point between the load characteristic and the characteristic of the torque in response to the speed of rotation.

The method according to the invention of stepwise control of the torque of the motor as a function of the speed of rotation may be varied in many ways without departing from the spirit of the invention. For example as mentioned above it is possible to use more than one set of additional windings to obtain a larger number of different torques at the same speed of rotation.

The windings of a set of additional windings may possibly also be connected in such as way that the fields therefrom are in phase opposition to the fields from the main windings. Thereby it is made possible to obtain a still larger number of torques at one speed of rotation.

What is claimed is:

1. A method of stepwise speed control in a three-phase squirrel-cage motor having three-phase stator coils including two sets of windings in mixed connections, such as substantially equal main windings and substantially equal additional windings, the latter being so mounted that their magnetic fields are in phase with those of the corresponding main windings, comprising the steps of: gradually increasing the rotational speed of the motor by consecutive operational modes, by first connecting in star said additional windings, and serially connecting said main windings to the resulting star circuit, to attain a single star-series connection, wherein the terminals of said additional windings that are opposite to those serially connected to said corresponding main windings are at a common point (FIG. 1); then connecting in delta said additional winding, and connecting said main windings to the resulting delta circuit, the latter being constituted between said serially connected terminals of the additional windings (FIG.2); connecting the main windings in a single star circuit, wherein one terminal of all said windings is at a common pint (FIG. 3); connecting in series said main and said additional windings of each phase, and connecting in delta the resulting series branches, to attain a delta - series connection (FIG. 4); and finally connecting in delta said main windings, and connecting said additional windings to the resulting delta circuit (FIG. 5).

* * * * *